United States Patent
Wong (10) Patent No.: US 9,396,754 B1
(45) Date of Patent: Jul. 19, 2016

(54) WRITE PROTECT INTEGRATED PICKER

(71) Applicant: Spectra Logic Corporation, Boulder, CO (US)

(72) Inventor: Walter Wong, Boulder, CO (US)

(73) Assignee: Spectra Logic, Boulder, CO (US)

( * ) Notice: Subject to any disclaimer, the term of this patent is extended or adjusted under 35 U.S.C. 154(b) by 0 days.

(21) Appl. No.: 14/735,882

(22) Filed: Jun. 10, 2015

(51) Int. Cl.
*G11B 15/68* (2006.01)
*G11B 20/00* (2006.01)
*G11B 5/008* (2006.01)
*G11B 5/78* (2006.01)

(52) U.S. Cl.
CPC ...... *G11B 20/00876* (2013.01); *G11B 5/00813* (2013.01); *G11B 5/78* (2013.01); *G11B 15/6835* (2013.01); *G11B 15/6895* (2013.01)

(58) Field of Classification Search
CPC .............. G11B 15/6835; G11B 15/689; G11B 15/688; G11B 23/042; G11B 15/6885; G11B 15/02
USPC ........... 360/92.1; 700/214; 414/273; 720/632
See application file for complete search history.

(56) References Cited

U.S. PATENT DOCUMENTS

| 6,947,237 B2 | 9/2005 | Christie, Jr. | |
| 2006/0026623 A1* | 2/2006 | Asano | G11B 23/107 720/729 |
| 2007/0171561 A1* | 7/2007 | Yip | G11B 15/07 360/69 |

FOREIGN PATENT DOCUMENTS

| JP | 04074348 A | * | 3/1992 |
| JP | 10031853 A | * | 2/1998 |
| JP | 2013206525 A | * | 10/2013 |

OTHER PUBLICATIONS

English-machine translation of JP 2013-206525 A to Motokawa, published Oct. 7, 2013.*

* cited by examiner

*Primary Examiner* — Will J Klimowicz
(74) *Attorney, Agent, or Firm* — Kenneth Altshuler (57) ABSTRACT

A data storage library is described that essentially provides a write once and read many (WORM) conversion device integrated with a picker device all of which are inside of the data storage library. One embodiment contemplates that after receiving a request to store data in a WORM arrangement on a tape cartridge in the data storage library a tape cartridge selected from a scratch pool of tape cartridges can be converted to a WORM tape cartridge via the picker device, during the normal activity of using a picker device to grasp the selected tape cartridge.

16 Claims, 12 Drawing Sheets

WRITE PROTECT INTEGRATED PICKER

CROSS-REFERENCE TO RELATED APPLICATIONS

None.

BACKGROUND OF THE INVENTION

1. Field of the Invention

The present invention relates generally to tape libraries write protecting tape cartridges in tape libraries.

2. Description of Related Art

Data storage libraries, such as tape libraries, are typically used to store and retrieve large amounts of data for data manipulation and archiving purposes. These libraries are generally comprised of drive devices adapted to read and write data to and from tape cartridges that are often housed within the tape libraries. In the interest of protecting stored data from being overwritten, write once and read many (WORM) schemes can be employed on storage media. For example, CDs and DVDs can only be written once. Tape cartridges can be rewritten over and over, but can be write protected by manually toggling a write protect switch turning that tape cartridge into a WORM tape cartridge. The write protect switch on the tape cartridge is designed to be toggled by a human fingernail, obviously outside of any tape library or tape system. In fact, any tape cartridge designated as a WORM tape cartridge is done so when the tape is new and before loading the WORM tape cartridge in a tape library.

It is to improvements directed to WORM designation of tape cartridges that both methods and apparatus are disclosed herein. It is to innovations related to this subject matter that the claimed invention is generally directed.

SUMMARY OF THE INVENTION

The present invention relates generally to dynamic write protect of tape cartridges within tape libraries overcoming the disadvantages and limitations of the prior art by dynamically changing write protect on a tape cartridge using WORM designation station/s within a robotic tape library so as to create a WORM tape cartridge within tape library without the intervention of human hands or the designation of a WORM tape cartridge through software mapping.

One embodiment of the present invention can therefore comprise a method comprising: providing a tape library with a scratch pool of tape cartridges, at least one tape drive, a robotic transporter possessing a picker device; receiving a request to store data in a write once and read many (WORM) arrangement on one of the tape cartridges from the scratch pool; selecting a tape cartridge from the scratch pool of tape cartridges, the tape cartridge possessing a write protect switch that when moved to a closed position prevents writing to the tape cartridge; moving the tape cartridge from the scratch pool of tape cartridges to the tape drive via the robotic transporter; loading the tape cartridge into the tape drive; storing the data to the tape cartridge via the tape drive; engaging the write protect switch via a write protect toggle device integrated with the picker device after the storing step; moving the write protect switch to the closed position via the write protect toggle device after the engaging step.

Other embodiments of the present invention may additionally provide a tape library comprising: at least one tape drive; a plurality of tape cartridges, each of the tape cartridges possessing a write protect switch; a robotic transporter possessing a picker device, the picker device adapted to grasp and release one of the tape cartridges at a time; a write protect toggle device integrated with the picker device, the write protect toggle device adapted to engage the write protect switch associated with the one of the tape cartridges and adapted to physically toggle the write protect switch between a write position that allows a tape to be written to via the tape drive and a write protect position that disables the tape drive from writing to the one of the tape cartridges.

Yet further embodiments of the present invention may comprise a method comprising: providing a tape library with a first and a second tape cartridge, the first tape cartridge possessing a write protect switch that when moved to a closed position prevents writing to the first tape cartridge, at least one tape drive, a robotic transporter possessing a picker device; receiving a request to write protect data stored to the first tape cartridge; storing the data to the tape first cartridge via the tape drive; engaging the write protect switch via a write protect toggle device integrated with the picker device after the storing step; moving the write protect switch to the closed position via the write protect toggle device after the engaging step; grasping the first tape cartridge while the first tape cartridge is at least partially retained in the tape drive; removing the first tape cartridge from the tape drive via the picker device; and transporting the first tape cartridge to a shelf system in the tape library via the robotic transporter.

DETAILED DESCRIPTION

Initially, this disclosure is by way of example only, not by limitation. Thus, although the instrumentalities described herein are for the convenience of explanation, shown and described with respect to exemplary embodiments, which generally include, but are not limited to, dynamically switching a tape cartridge between being write protecting and being able to be overwritten inside of a tape library without intervention of human hands. It will be appreciated that the principles herein may be applied equally in other types of situations involving similar uses for write protect to protect against data overwrite on magnetic tape consistent with the scope and spirit of the present invention.

Figure 1:
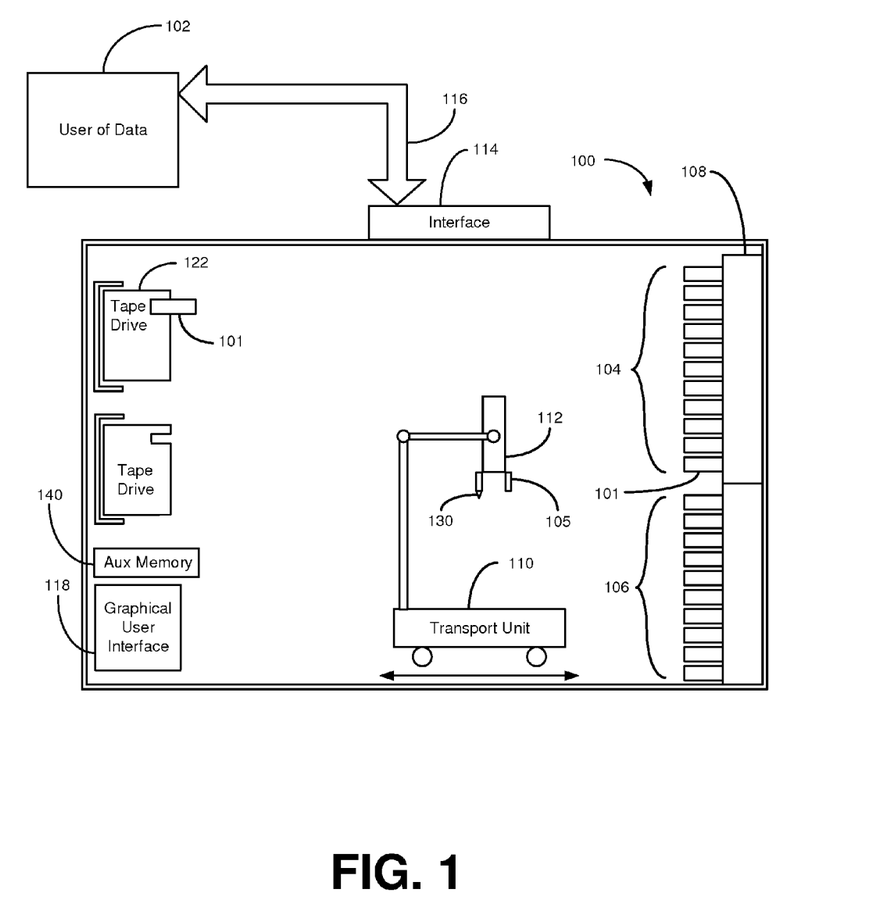
FIG. 1 is an illustration of a data storage arrangement constructed in accordance with an embodiment of the present invention.

Referring to the drawings in general, and more specifically to FIG. 1, shown therein is an illustration of a data storage arrangement constructed in accordance with an embodiment of the present invention. In what follows, similar or identical structures may be identified using identical callouts. FIG. 1 depicts certain basic elements in a data storage library for descriptive purposes. In reality, a data storage library possesses CPUs, keyboard, power lines, fans, CAN (computer area network), buses, switches, and many other electrical and mechanical devices known to those skilled in the art.

The data storage arrangement illustrated in FIG. 1 can comprise a user of data 102, such as a client, in communication with a data storage library 100. As illustratively shown, the client 102 is in communication with the library 100 via a communication path 116 and a library interface device 114. The library 100 comprises a plurality of tape cartridges 101 disposed in a shelf system 108, which in some embodiments contemplate the tape magazine (not shown) which resembles a shoebox containing a plurality of tape cartridges 101. The shelf system holds tape cartridges 101 inside of the data storage library 100. Certain embodiments contemplate each of the tape cartridges 101 containing an auxiliary radio frequency memory device (not shown) capable of storing auxiliary digital data. Embodiments depicted herein contemplate each tape cartridge 101 providing a Write Protect Switch 202 that when toggled changes the tape cartridge 101 from a WMRM (Write Many Read Many) tape cartridge to a WORM (Write Once Read Many) tape cartridge, shown in FIG. 2A for example.

With continued reference to FIG. 1, depicted are two tape drives 122, each adapted for reading and writing data to and from one of the plurality of tape cartridges 101. The tape cartridges 101 are moved between the shelf system 108 and the tape drives 122 via a robotic transport unit 110. The robotic transport unit 110 further possesses a picker device 112 that is adapted to grasp and release a tape cartridge 101, such as to remove a tape cartridge 101 from the shelf system 108 and insert the tape cartridge 101 in an opening (not shown) in the tape drive 122, for example. Certain embodiments contemplate multiple robotic units 110 and multiple picker devices 112 in a data storage library 100. Yet other embodiments contemplate a picker device not integrated with a robotic transporter functioning within the scope and spirit of the present invention. As further depicted, the data storage library 100 possesses auxiliary memory 140 that can store and maintain data within the data storage library 100 such as the location of each tape cartridge 101, routines the control devices within the data storage library 100, etc. The auxiliary memory 140 can be a hard disk drive, solid state memory device, and the like within the scope and spirit of the present invention. Also depicted is a graphical user interface 118, which an operator can use the input commands or data into the data storage library 100. The data storage library 100 is further depicted with two groups of tape cartridges 101, a scratch pool of WMRM tape cartridges 104 and a pool of WORM dedicated tape cartridges 106, i.e., tape cartridges in the scratch pool that will be dedicated for WORM applications. The WORM dedicated tape cartridges 106 are tape cartridges 101 that will be dedicated for worm use.

Figure 2A:
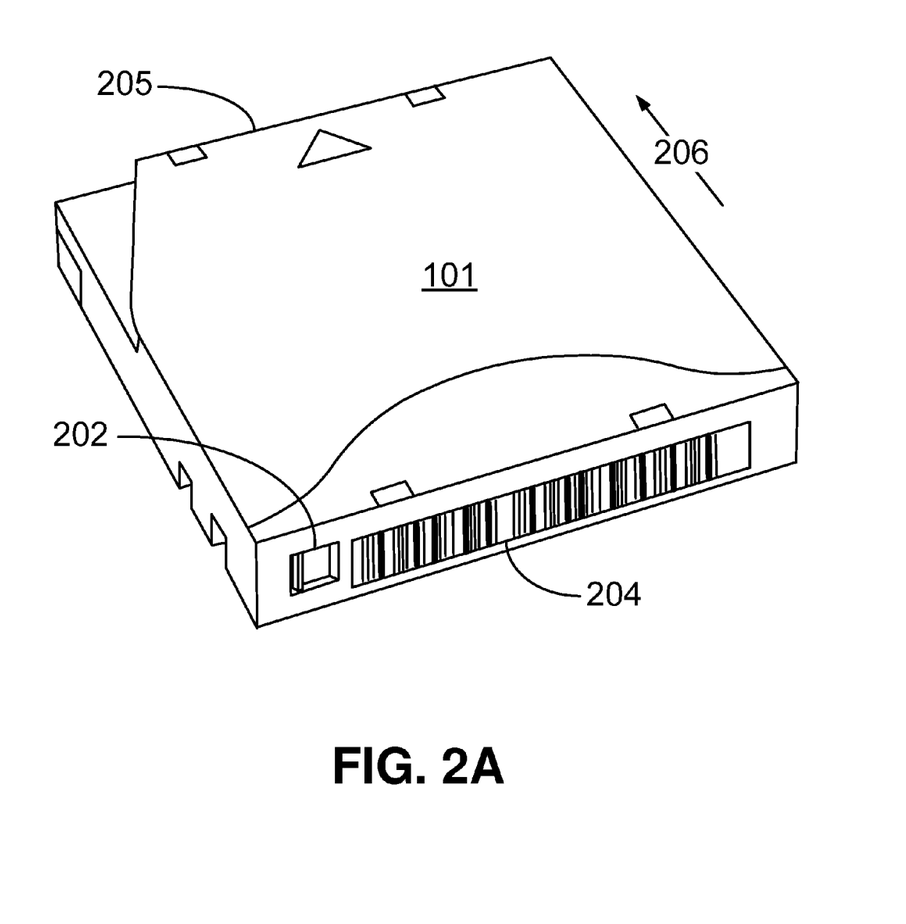
FIG. 2A depicts a perspective illustration of an embodiment of a tape cartridge consistent with embodiments of the present invention.

FIG. 2A depicts a perspective illustration of an embodiment of a tape cartridge 101 consistent with embodiments of the present invention. As shown, the tape cartridge 101 possesses a write protect switch 202 that when toggled alters the tape cartridge 101 to be either a WMRM tape cartridge or a WORM tape cartridge. A bar code 204 is disposed on the outer facing face of the tape cartridge 101, for reference. The tape cartridge 101 possesses an outer housing 205 that contains the tape medium 208 (shown in FIG. 2B) and a MAM 210, Medium Auxiliary Memory, (also shown in FIG. 2B), as well as other components known to those skilled in the art such as, a leader pin, spindle, etc. The arrow 206 indicates the direction to which the tape cartridge 101 is inserted into a tape drive 122.

Figure 2B:
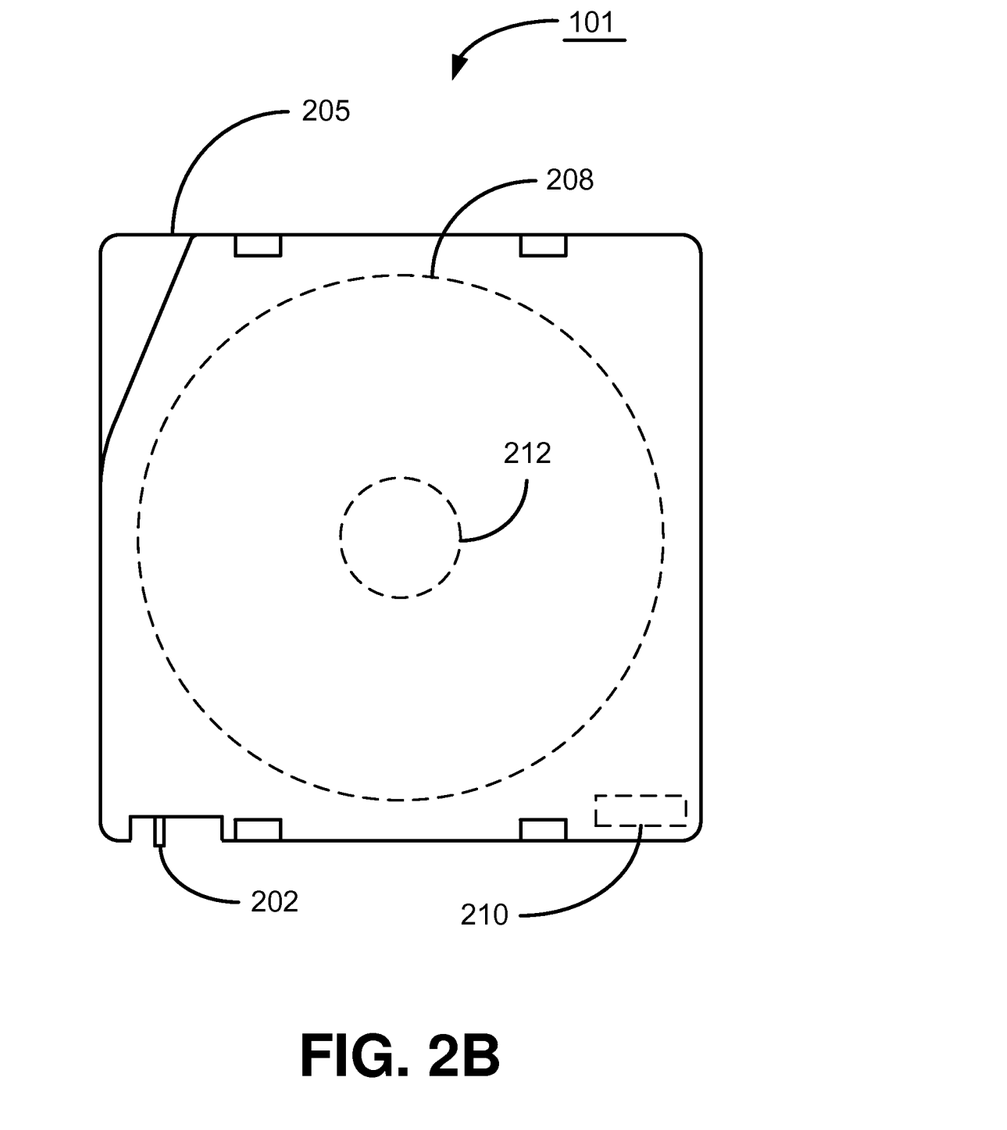
FIG. 2B illustratively depicts the tape cartridge consistent with embodiments of the present invention.

FIG. 2B illustratively depicts the tape cartridge 101 consistent with embodiments of the present invention. As shown by the dashed lines, contained within the tape cartridge housing 205 are the tape medium 208, the spindle 212, and the MAM 210. The tape medium 208 is typically a magnetic tape medium, which is wrapped around the spindle 212. The MAM 210 is an RFID (Radio Frequency Identification) device that possesses and antenna (not shown), which is activated inductively in the presence of a radio frequency, such as from the MAM reading/writing device (not shown). In one embodiment, the MAM 210 possesses non-volatile memory which can be parceled into different data specific regions. For example, a MAM 210 can be parceled into a medium device region which contains information such as serial number, a device region which contains information from the tape drive such as load count, a host/vendor unique region. One embodiment contemplates the host/vendor unique region being capable of containing information such as the tape cartridge 101 being designated as a WORM tape cartridge or a WMRM tape cartridge, via the write protect switch 202. Other embodiments contemplate no constraint to any specific location or parcel in the MAM 210 containing the information of whether or not a tape cartridge 101 is designated as a WORM tape cartridge or a WMRM tape cartridge. A MAM reading device, in certain embodiments, is integrated in a tape drive 122. Other embodiments envision an MAM reading device in various locations around the data storage library 100. A MAM reader device may be located with the robotic transporter 110, the picker device 112, in the shelf system 108, for example. A MAM reader device can verify that a tape cartridge 101 has been write protected assuming the MAM device 210 has knowledge of the write protect stored therein.

Figure 3:
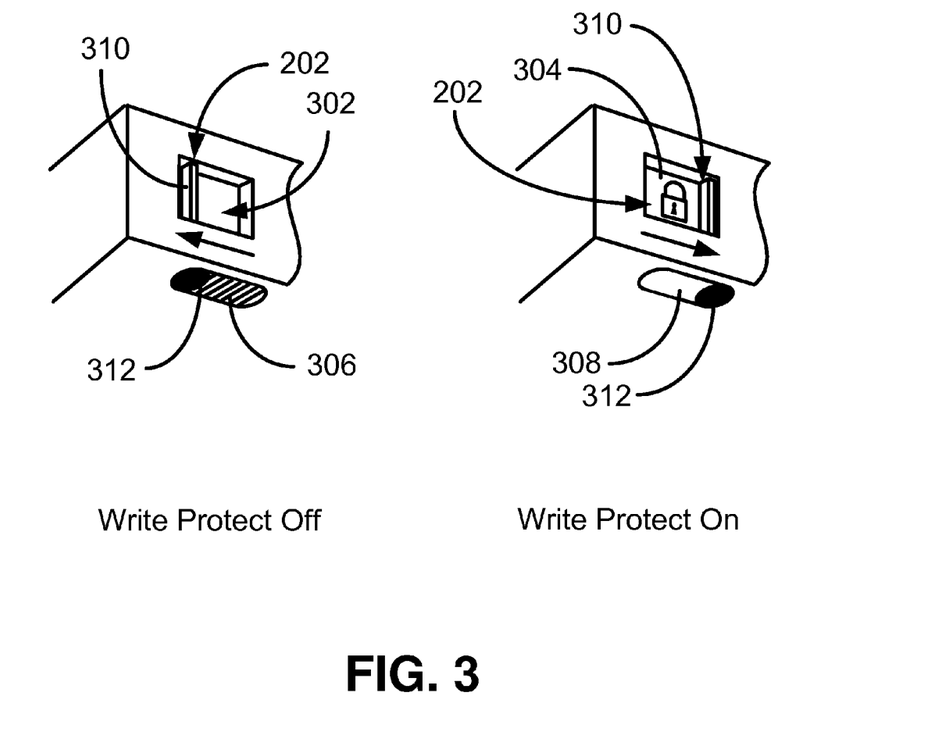
FIG. 3 illustratively depicts an embodiment of the write protect switch consistent with embodiments of the present invention.

FIG. 3 illustratively depicts an embodiment of the write protect switch 202 shown in more detail from FIG. 2A. In the depicted embodiment, the write protect switch 202 is a singular unit generally possessing a door 304, a lip 310 that protrudes from the door 304, and a knob 312, that is essentially flush with the tape cartridge housing 205. As shown, when the write protect switch 202 is in the open state (image to the left), the tape cartridge 101 is physically identified by the tape drive 122 as a WMRM tape cartridge. In this state where the write protect is disabled, there is a write many opening 302. However, when the write protect is disabled, the knob 312 on the bottom of the tape cartridge 101 is in a closed position covering the write protect opening 308 with a plastic shield, or door, 306 (as depicted via the hash marks). When the write protect switch 202 is in the closed state (image to the right), the tape cartridge 101 is physically identified by the tape drive 122 as a WORM tape cartridge. In this state where the write protect is enabled, the write many opening 302 is covered by a plastic (or other suitable material) shield, or door, 304 shown with a lock on the plastic shield 304. However, when the write protect is enabled, the knob 312 on the bottom of the tape cartridge 101 is in an open position whereby the write protect opening 308 is exposed allowing a pin (not shown) associated with the tape drive 122 to penetrate through the write protect opening 308 so that the tape drive 122 can identify the tape cartridge 101 as a write protected tape cartridge.

Figure 4A:
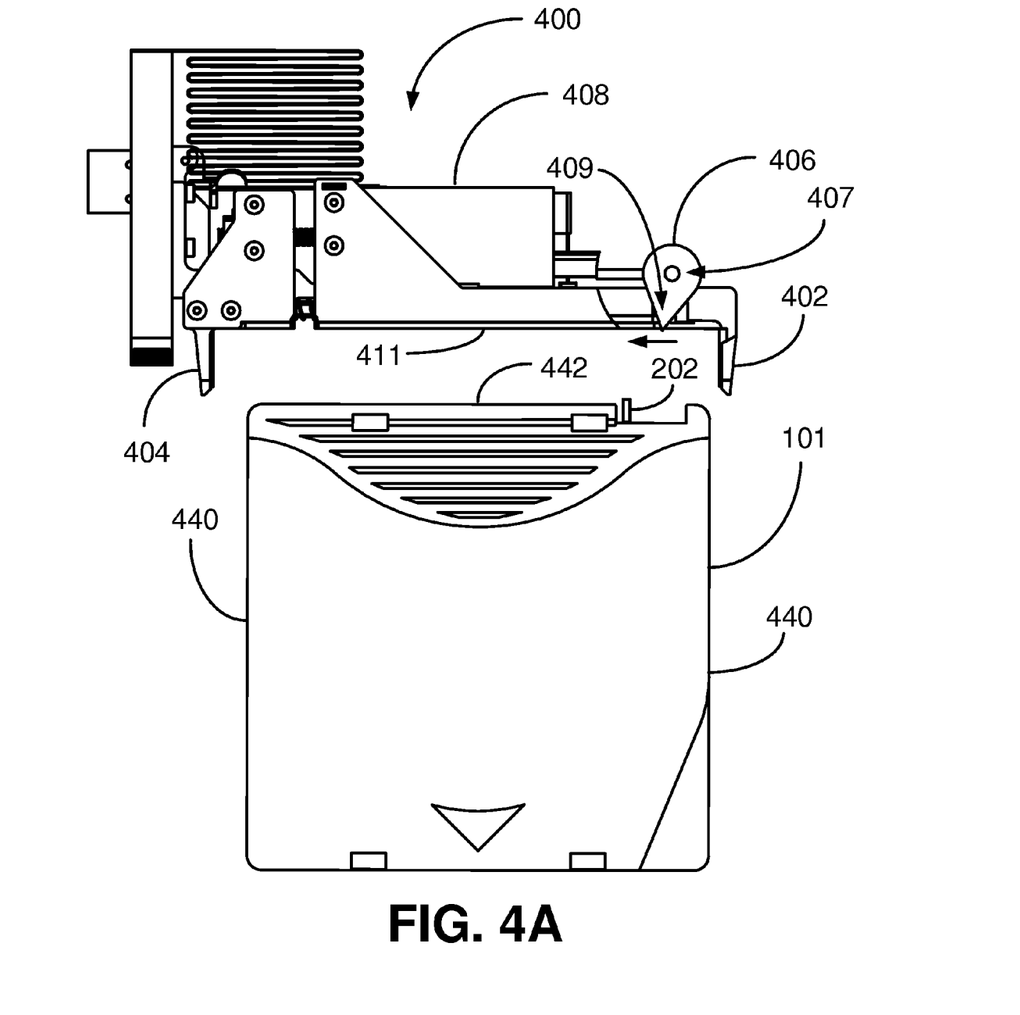
FIGS. 4A and 4B illustratively depict a write protect switch being toggled by a picker integrated toggling device consistent with embodiments of the present invention.
Figure 4B:
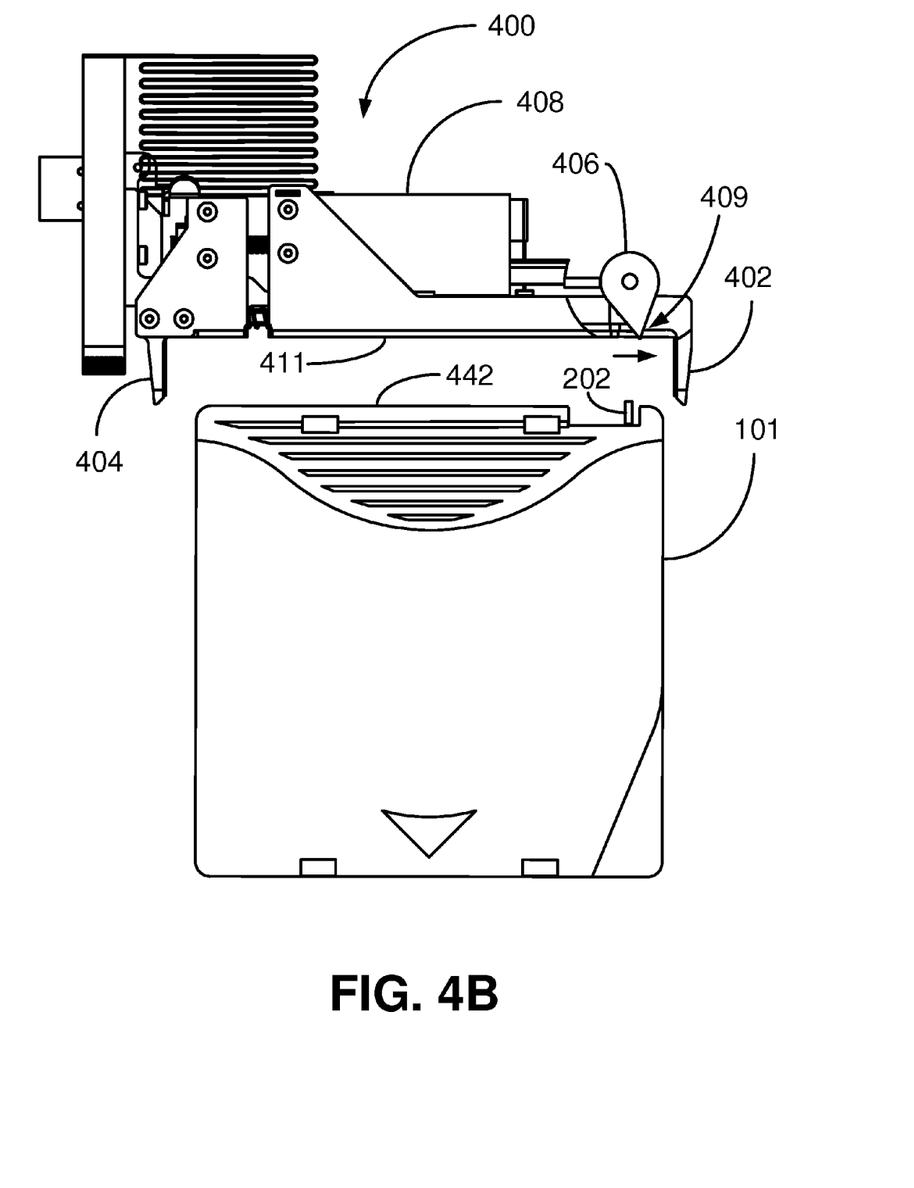

FIGS. 4A and 4B illustratively depict a motorized write protect toggling device 406 integrated in the picker device 400 consistent with embodiments of the present invention. As shown, the write protect toggling device 406 is pivotally integrated with the picker device 400. The picker device 400 possesses, among other things, a motor 408 that drives the write protect toggling device 406 to pivot about a pivoting point 407. The picker device 400 further possesses a first gripper 402 and a second gripper 404 that compress against the sides of the tape cartridge 440 when the top of the tape cartridge 442 is essentially in contact with the mating surface 411 of the picker device 400. When the picker device 400 is grasping the tape cartridge 101 (not shown), a lever 409 integrated with the write protect toggling device 406 can be moved right or left when the write protect toggling device 406 is pivoted about the pivot point 407. The lever 409 through this action will move the write protect switch 202 to a write protect "on" or write protect "off" position. FIG. 4A depicts the write protect switch 202 moved in a closed position (write protect "on") is also indicated by the arrow pointing to the left and the lever 409 in the left position. FIG. 4B depicts the write protect switch 202 moved in an open position (write protect "off"), whereby the tape cartridge 101 is not write protected, indicated by the arrow pointing to the right and the lever 409 pointing in the right position.

Figure 5A:
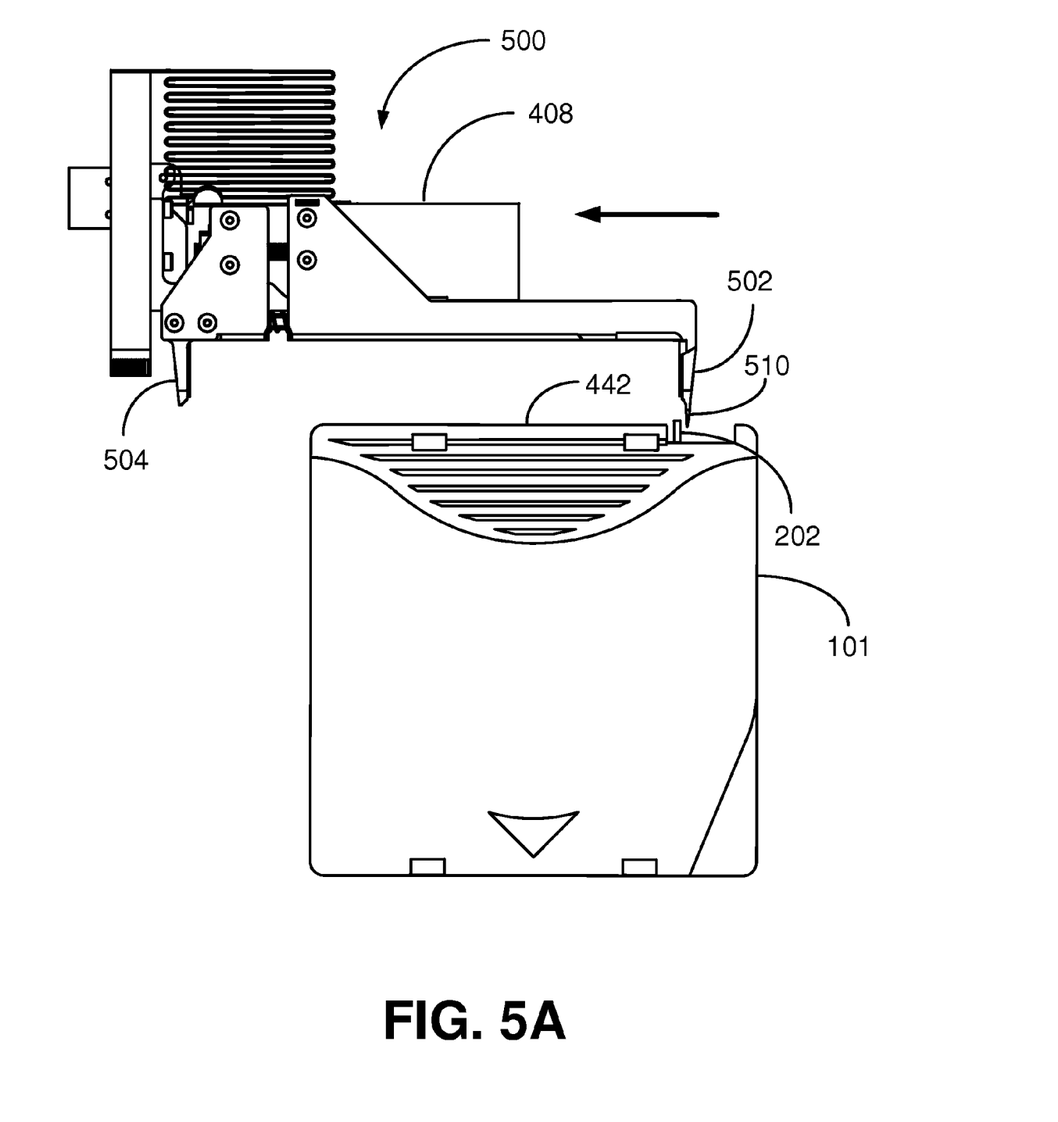
FIGS. 5A and 5B illustratively depict a write protect switch being toggled by a picker integrated toggling device consistent with embodiments of the present invention.
Figure 5B:
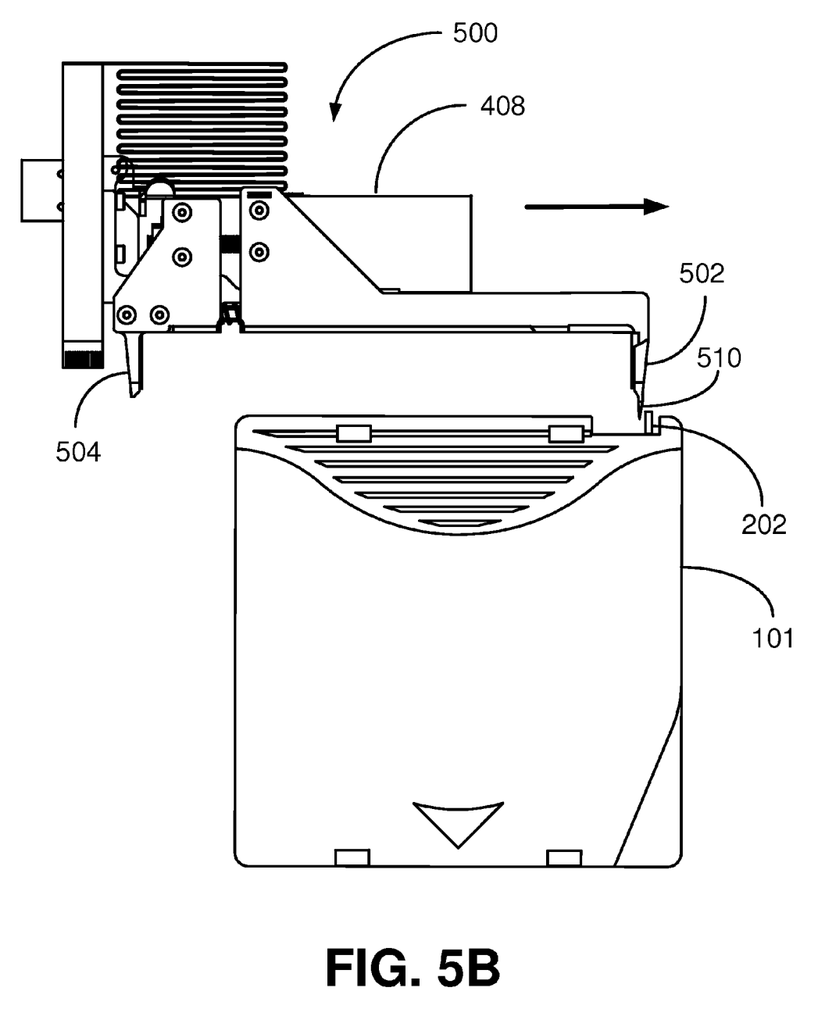

FIGS. 5A and 5B depict a simplified illustration of a finger element 510 extending from one of a pair of grippers 502 and 504 of the picker device 500 consistent with embodiments of the present invention. In this illustrated embodiment, the tape cartridge 101 is held in place (for example, when partially disposed in a tape drive 122, in a shelf system 108, in a tape cartridge magazine (not shown), or other suitable location to hold a tape cartridge 101 in place), while the finger element 510 that extends from a gripper engages the write protect switch 202 and the picker device 500 is moved across the top of the tape cartridge 442. FIG. 5A depicts the picker device 500 slidingly engage the write protect switch 202 wherein the entire picker device 500 moves to the left as indicated by the arrow, thus switching the write protect to "on" (in write protect mode). FIG. 5B depicts the picker device 500 slidingly engage the write protect switch 202 wherein the picker device 500 moves to the right as indicated by the arrow, thus switching the write protect to "off" (not in write protect mode).

Figure 5C:
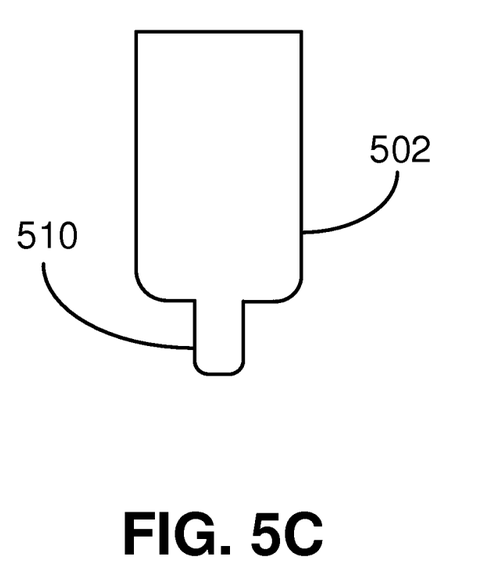
FIG. 5C illustratively depicts an embodiment of a write protect toggling device consistent with embodiments of the present invention.

FIG. 5C depicts a simplified illustration of the finger element 510 on the gripper 502 consistent with embodiments of the present invention. The finger element 510 is geometrically sized to engage the write protect switch 202 to toggle in the write protect mode or a WMRM mode.

Figure 6:
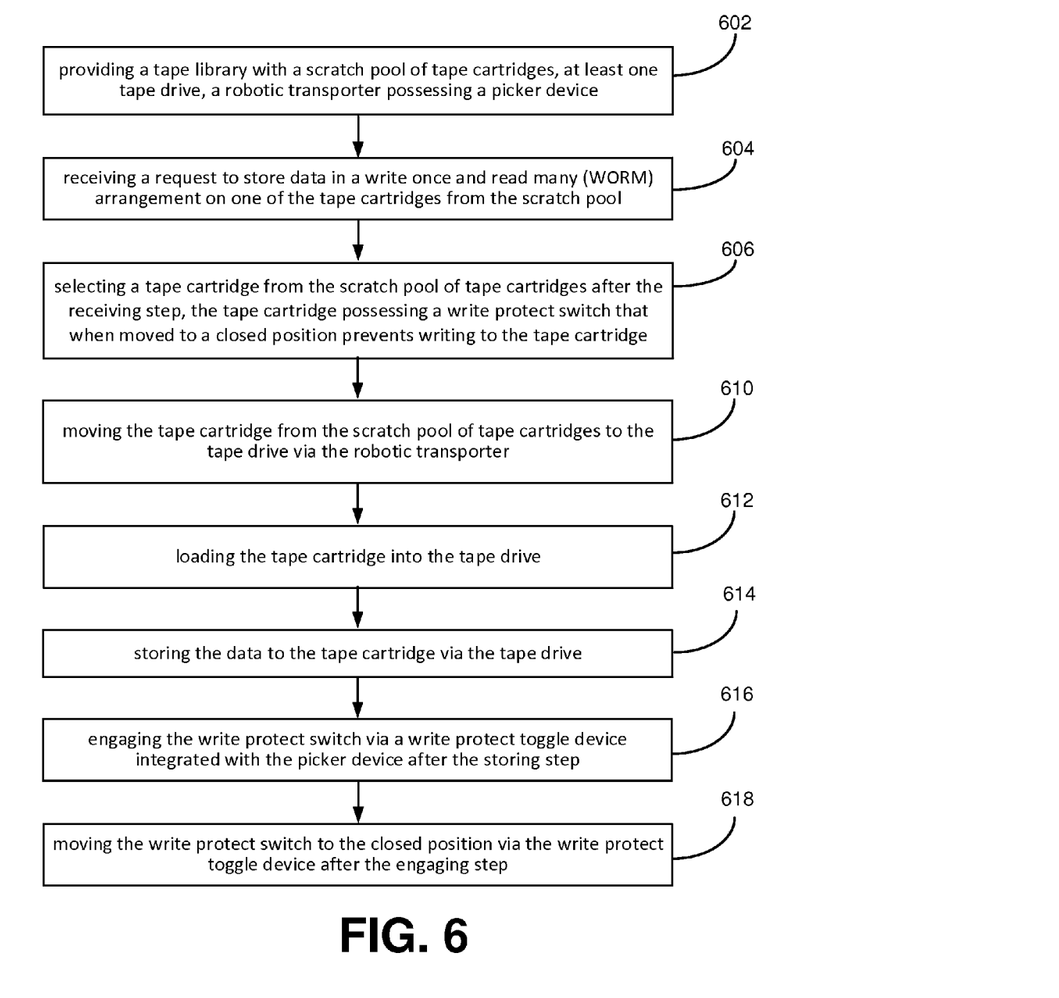
FIG. 6 depicts a method embodiment consistent with embodiments of the present invention.

FIG. 6 is a flow chart of a method embodiment consistent with embodiments of the present invention. In one embodiment, FIG. 6 can be described in conjunction with FIGS. 4A-4B (and 5A-5B). Fundamentally, a data storage library 100 consistent with FIG. 1 is provided containing a scratch pool of WMRM tape cartridges 104 (which may additionally comprise a scratch pool of tape cartridges intended to be used as WORM tape cartridges 106), at least one tape drive 122, and a write protect toggling device 406 integrated him with a picker device 400 that switches a tape cartridge 101 between a WMRM tape cartridge and a WORM tape cartridge, block 602. The tape cartridges 101 possess a write protect switch 202 that when moved to a "closed" position prevents writing to the tape cartridge 101. Block 604 shows receiving a request to store data in a WORM arrangement on one of the tape cartridges 101 from the WMRM scratch pool 104. Certain embodiments contemplate the request received from a client 102, but other embodiments contemplate the request inputted by an operator, for example. The request generally includes instructions to move a tape cartridge 101 to a specific tape drive 122 via a specific robotic transport unit 110. Embodiments contemplate the write protecting request being made before storing data to the selected tape cartridge 101, while other embodiments contemplate after data has been stored to the tape cartridge 101, a request is made to write protect that data (either immediately after writing the data or sometime in the distant future).

Method step 606 refers to selecting the tape cartridge 101 to be converted in a WORM configuration from the WMRM scratch pool 104. Selecting the tape cartridge 101 can be relegated to a predefined parameter associated with each of the tape cartridges 101. For example, because tape cartridges 101 converted to a WORM configuration will possibly never be over-written once data has been written to the tape medium 208, it may be advantageous to choose a tape cartridge 101 based on a predefined parameter such as a previously used tape cartridge. The predefined parameter is envisioned to include the most used tape cartridge having the most run time on it (e.g., the most reads and/or writes), a tape cartridge that has been previously written to the most, a tape cartridge that has been previously read the most, a tape cartridge that has been loaded the most times into a tape drive 122, a tape cartridge that has been simply used previously from a pool of tape cartridges that have never been used, a tape cartridge that has been previously used multiple times (that is more than once), the oldest tape cartridge in the WMRM pool 104 even if the oldest tape cartridge has never been used (oldest being defined as the earliest manufacturing date of the tape cartridge relative to all the other tape cartridges), one of the oldest tape cartridges in the WMRM pool 104, and the like.

Method step 610 is directed to moving the tape cartridge 101 from the scratch pool of tape cartridges 104 to a tape drive 122 via the robotic transporter 110 and picker device 400 based on the request. Method steps 612 and 614 are directed to loading the selected tape cartridge 101 into the tape drive 122 and storing data to the selected tape cartridge 101 via the tape drive 122 what a cooperating relationship, i.e., a read/write relationship is formed. After the data has been written and they selected tape cartridge 101 is ejected from the tape drive 122 (i.e., no longer in a read/write engagement with the internal mechanisms of the tape drive 122), the write protect toggle device 406 engages the write protect switch 202 when the picker device 400 grasps the selected tape cartridge 101, as featured in step 616. Once the write protect switch 202 is moved to the "closed" position on the selected tape cartridge 101 via the write protect toggle device 406, the selected tape cartridge 101 is write protected until the write protect switch 202 is moved to an "open" position. Certain embodiments contemplate that the moving step 610 through the moving step 618 are done entirely within the tape library 100. Certain embodiments contemplate receiving instructions to switch the selected tape cartridge 101 to write protect the data therein with the instructions to select the tape cartridge from the scratch pool of tape cartridges 104/106, while other embodiments contemplate receiving instructions to switch the selected tape cartridge 101 to write protect mode is received sometime after selecting the tape cartridge 101.

Figure 7:
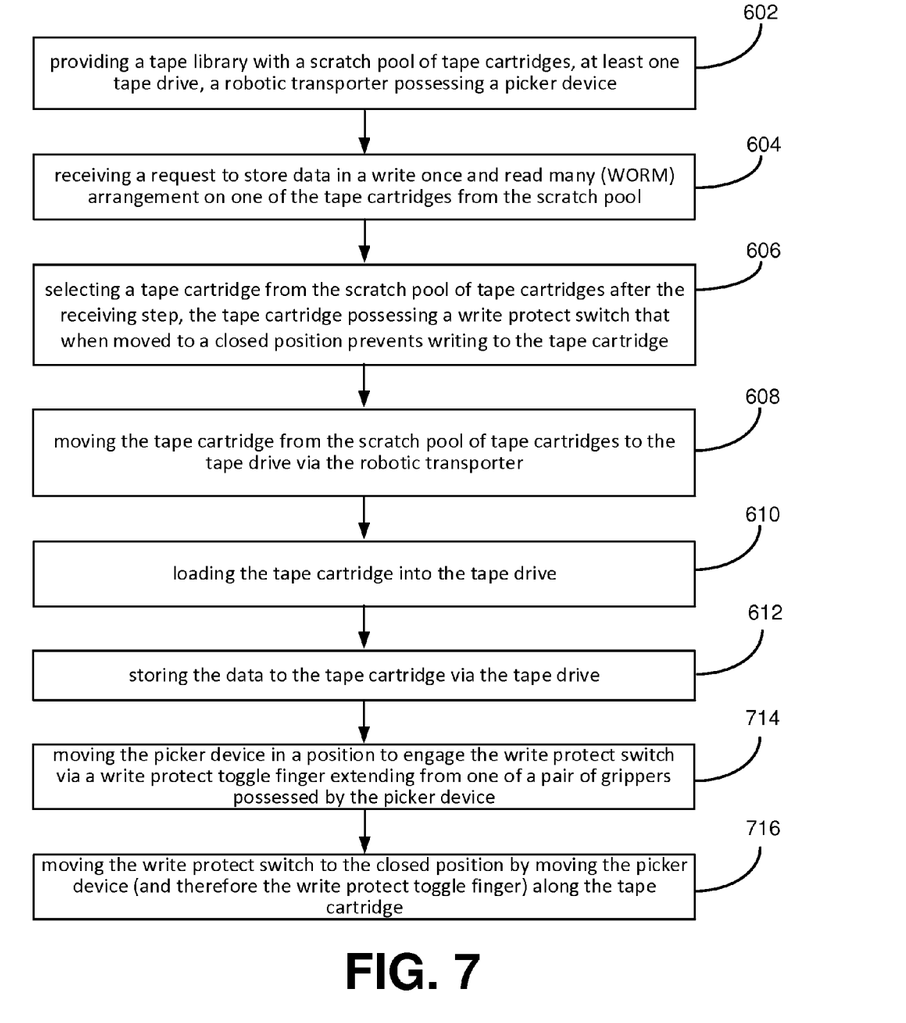
FIG. 7 depicts a method embodiment consistent with embodiments of the present invention.

FIG. 7 depicts a method embodiment consistent with embodiments of the present invention. In one embodiment, FIG. 7 can be described in conjunction with FIGS. 5A-5C. Steps 602-612 have essentially been discussed above. Moving on to step 714, the picker device 500, which possesses a write protect toggle finger 510 extending from one of the grippers 502, is positioned over the write protect switch 202 and moved towards the write protect switch 202 in order to engage the write protect switch 202 on the selected tape cartridge 101. Step 714 is depicted in FIG. 5A. Though not shown, the picker device 500 can be positioned three dimensionally relative to a tape cartridge. Accordingly, the picker device 500 can be positioned to engage the write protect switch 202 by moving the write protect toggle finger 510 over the tape cartridge 101 in a position which would not facilitate grasping the tape cartridge 101. Step 716 is directed to moving the write protect switch 202 to the "closed" position (in write protect mode) by moving the picker device 500 in the direction shown by the arrow along the top of the tape cartridge 442 while the write protect toggle finger 510 is engaged with the write protect switch 202. FIG. 5B depicts the picker device 500 moving the write protect switch 202 in the "open" position as indicated by the picker device 500 moving in the direction of the arrow to the right. One embodiment contemplates the selected tape cartridge 101 being still retained at least partially within the tape drive 122, whereby the selected tape cartridge 101 is held in place, while the picker device 500 slidingly pushes the write protect toggle switch 202 in the open or closed position via the write protect toggle finger 510. Other embodiments contemplate the selected tape cartridge 101 being retained in the shelf system 108, a magazine (not shown), or some other location that is capable of holding the tape cartridge 101 in place while the picker device 500 toggles the write protect switch 202 between an "open" position and a "closed" position. After the write protect switch 202 has been toggled either "open" or "closed", the picker device 500 is positioned over the selected tape cartridge 101 in a manner allowing the graspers 502 and 504 to clamp down over the sides 440 of the tape cartridge.

Figure 8:
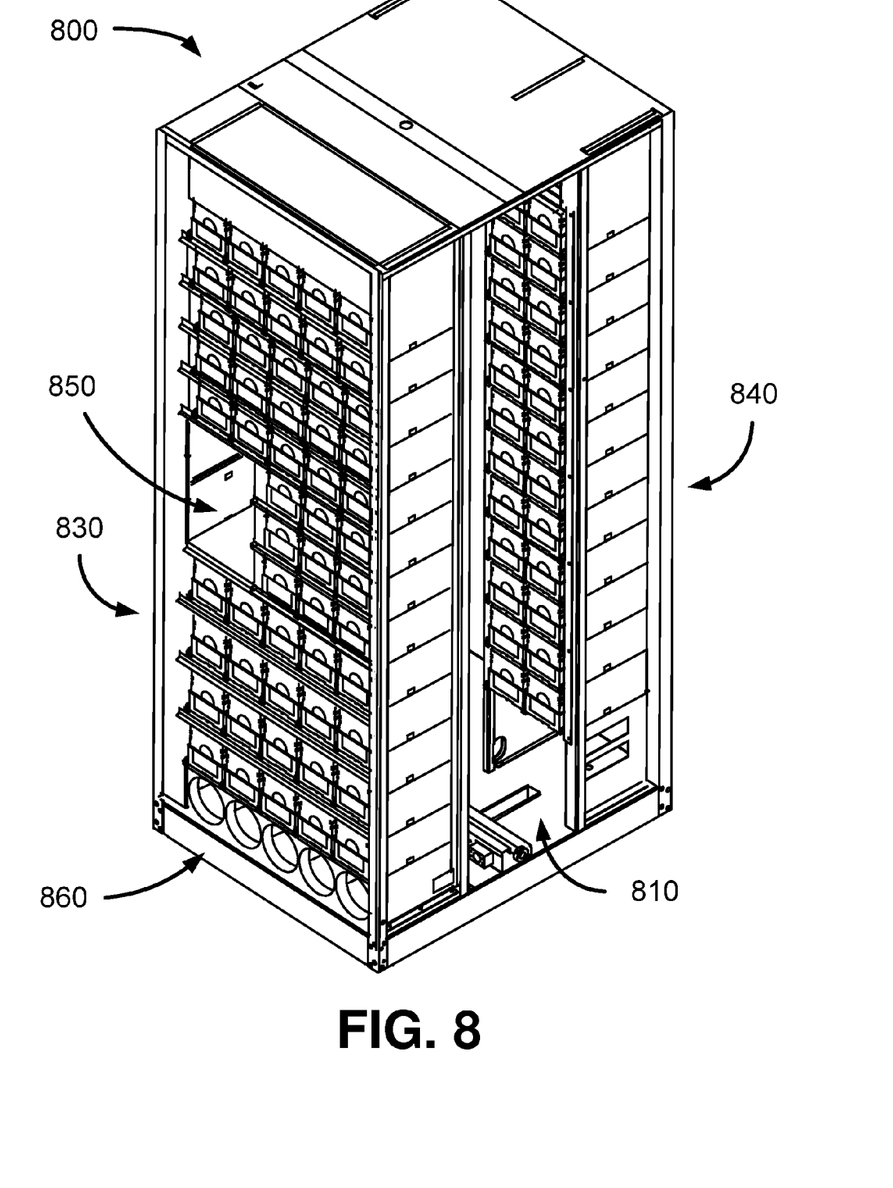
FIG. 8 shows a commercial embodiment of one T-950 library unit wherein aspects of the present invention can be practiced.

Embodiments of the present invention can be commercially practiced in a Spectra Logic T-Finity tape cartridge library manufactured by Spectra Logic of Boulder Colo., shown in FIG. 8. The T-Finity unit 800 comprises a first and second shelf system 830, 840 that are adapted to support a plurality of the removable storage devices, such as the tape cartridge magazines that contain a plurality of tape cartridges 101. The second shelf system 830 has at least one tape drive (not shown) adapted to read and write data to and from a selected tape cartridge 101. Functionally interposed between the first and second shelf system 830, 840 is a magazine transport space 810. The magazine transport space 810 provides adequate space for a tape cartridge magazine (not shown) to be moved, via a magazine transport (not shown), from a position in the shelf system 830, 840 to a tape drive (not shown). The selected tape cartridge 101 is transferred from the tape cartridge magazine to the tape drive and inserted there in via a picker device (not shown) that possesses an integrated write protect toggle device, such as element 406 or 510. Tape cartridge magazines can be transferred into and out from the T-Finity library via the entry/exit port 850. The T-Finity tape library 800 includes a means for cooling as shown by the fans 860 located at the base.

It is to be understood that even though numerous characteristics and advantages of various embodiments of the present technology have been set forth in the foregoing description, together with the details of the structure and function of various embodiments of the invention, this disclosure is illustrative only, and changes may be made in detail, especially in matters of structure and arrangement of parts within the principles of the present technology to the full extent indicated by the broad general meaning of the terms in which the appended claims are expressed. For example, multiple or even predetermined pluralities of scratch pools can be managed for example, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though WORM tape cartridges may be selected from the scratch pool of WMRM tape cartridges based on a parameter, embodiments contemplate selecting a WMRM tape cartridge for conversion to a WORM tape cartridge based on random selection, some order of first chosen last chosen, new tape cartridges, all tape cartridges, downgrade older versions of tape cartridges, etc., for example, without departing from the scope and spirit of the claimed invention. Further, for purposes of illustration, a first and second tape drive 122 and tape cartridges 101 are used herein to simplify the description for a plurality of tape drives 122 and tape cartridges 101. Finally, although the preferred embodiments described herein are directed to tape drive systems, and related technology, it will be appreciated by those skilled in the art that the claimed technology can be applied to other systems, without departing from the spirit and scope of the present technology.

It will be clear that the claimed technology is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed technology disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:
1. A method comprising:
providing a tape library with a scratch pool of tape cartridges, at least one tape drive, a robotic transporter possessing a picker device, the picker device possessing a pair of grippers that are substantially diametrically opposed, the grippers adapted to grasp opposite sides of one of the tape cartridges, a finger extending distally from one of the grippers;
receiving a request to store data in a write once and read many (WORM) arrangement on one of the tape cartridges from the scratch pool;
selecting a tape cartridge from the scratch pool of tape cartridges, the tape cartridge possessing a write protect switch that when moved to a closed position prevents writing to the tape cartridge;
moving the tape cartridge from the scratch pool of tape cartridges to the tape drive via the robotic transporter;
loading the tape cartridge into the tape drive;
storing the data to the tape cartridge via the tape drive;
engaging the write protect switch via the finger after the storing step; and
moving the write protect switch to the closed position via the finger after the engaging step.
2. The method of claim 1 wherein the tape cartridge moving step through the engaging step are all done entirely within the tape library.

3. The method of claim 1 wherein the tape cartridge is selected from the scratch pool of tape cartridges based on being the oldest tape cartridge in the scratch pool.

4. The method of claim 1 wherein the tape cartridge is selected based on being previously used from the scratch pool that contains unused and used tape cartridges.

5. The method of claim 1 wherein the tape cartridge is selected based on being previously used multiple times from the scratch pool that contains unused and previously used tape cartridges.

6. The method of claim 1 wherein the tape cartridge is selected based on being previously used more than any other tape cartridge in the scratch pool, the scratch pool containing unused and used tape cartridges.

7. The method of claim 1 further comprising engaging the finger with the write protect switch and moving the picker device to toggle the write protect switch.

8. The method of claim 1 further comprising engaging the finger with the write protect switch and moving the picker device relative to the tape cartridge to toggle the write protect switch while the tape cartridge is disposed at least partially in the tape drive.

9. The method of claim 1 further comprising slidingly engaging the write protect switch with the finger.

10. The method of claim 9 further comprising moving the picker device to toggle the write protect switch while the tape cartridge is disposed at least partially in the tape drive.

11. A tape library comprising:
    at least one tape drive;
    a plurality of tape cartridges, each of the tape cartridges possessing a write protect switch;
    a robotic transporter possessing a picker device, the picker device providing a means for grasping and releasing one of the tape cartridges at a time; and
    means for toggling the write protect switch between an on and off position.

12. The tape library of claim 11 wherein the means for toggling the write protect switch is adapted to engage the write protect switch when the picker device is grasping one of the tape cartridges.

13. The tape library of claim 11 wherein the means for toggling the write protect switch is driven by a motor disposed at the picker device.

14. A tape library comprising:
    at least one tape drive;
    a plurality of tape cartridges, each of the tape cartridges possessing a write protect switch;
    a robotic transporter possessing a picker device, the picker device possessing a pair of opposing grippers adapted to grasp one of the tape cartridges at a time by squeezing opposite sides of the tape cartridge, a finger extending from and beyond the end of one of the grippers, said finger adapted to engage the write protect switch.

15. The tape library of claim 14 wherein the finger extends distally from the gripper.

16. The tape library of claim 14 wherein the write protect switch is adapted to be toggled between an on and off position by moving the picker device relative to the tape cartridge while the finger is engaged with the write protect switch.

* * * * *